(12) United States Patent
DeSantis (10) Patent No.: US 7,500,223 B2
(45) Date of Patent: Mar. 3, 2009

(54) AUTOMATICALLY CREATING JAVASCRIPT OBJECTS TO INVOKE METHODS ON SERVER-SIDE JAVA BEANS

(75) Inventor: Robert DeSantis, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 10/750,694

(22) Filed: Jan. 2, 2004

(65) Prior Publication Data

US 2006/0015842 A1    Jan. 19, 2006

(51) Int. Cl.
*G06F 9/44*    (2006.01)

(52) U.S. Cl. .................. 717/118; 707/102; 707/204

(58) Field of Classification Search .................. 717/118
See application file for complete search history.

(56) References Cited

U.S. PATENT DOCUMENTS

| | | | |
|---|---|---|---|
| 6,230,160 B1 * | 5/2001 | Chan et al. ............. | 707/103 X |
| 6,369,821 B2 * | 4/2002 | Merrill et al. .............. | 345/473 |
| 6,457,066 B1 * | 9/2002 | Mein et al. .................. | 719/330 |
| 6,542,908 B1 * | 4/2003 | Ims ............................ | 707/204 |
| 6,549,955 B2 * | 4/2003 | Guthrie et al. ............. | 719/315 |
| 6,836,889 B1 * | 12/2004 | Chan et al. ................. | 719/310 |
| 6,990,653 B1 * | 1/2006 | Burd et al. .................. | 717/108 |
| 7,043,732 B2 * | 5/2006 | Mandal et al. .............. | 719/310 |
| 7,093,194 B2 * | 8/2006 | Nelson ........................ | 715/513 |
| 2003/0218633 A1 * | 11/2003 | Mikhail et al. .............. | 345/760 |
| 2003/0218663 A1 * | 11/2003 | Baxter et al. ................ | 347/102 |

OTHER PUBLICATIONS

"AlphaBlox SpreadsheetBlox, Turning Reports into Personalized, Interactive Applications," © 2000 AlphaBlox Corporation, SPREADSHEET-DS-0900.
"Inside the Analysis Suite, A Technical Architecture Overview of AlphaBlox Analysis Suite," An AlphaBlox Technical White Paper, © 1999.
"SOAP—searchWebServices.com Definitions" [online], last updated Jul. 28, 2003, TechTarget Corporate WebSite [retrieved on Dec. 22, 2003]. Retrieved from the Internet: <URL: http://searchwebservices.techtarget.com/sDefinition/0,,sid26_gci214295,00.html>.
"COBRA—searchWebServices.com Definitions" [online], last updated Mar. 24, 2003, TechTarget Corporate WebSite [retrieved on Dec. 22, 2003]. Retrieved from the Internet: <URL: http://searchwebservices.techtarget.com/sDefinition/0,,sid31_gci213865,00.html>.
"JavaScript—searchWebServices.com Definitions" [online], last updated Mar. 12, 2003, TechTarget Corporate WebSite [retrieved on Dec. 22, 2003]. Retrieved from the Internet: <URL: http://searchwebservices.techtarget.com/sDefinition/0,,sid26_gci212418,00.html>.

* cited by examiner

*Primary Examiner*—Wei Y Zhen
*Assistant Examiner*—Phillip H Nguyen
(74) *Attorney, Agent, or Firm*—Mollborn Patents, Inc.; Fredrik Mollborn (57) ABSTRACT

Examination of a server-side Java bean to automatically generates a JavaScript representation of the methods in the bean. The JavaScript representations of the methods are sent to the Web browser. The browser then creates JavaScript objects that can be called directly from other JavaScript code on the client side, and which communicate with the server-side method.

14 Claims, 10 Drawing Sheets

Fig. 1

Fig. 4b
Functional Description of Automatically Generated Javascript

Fig. 4a
Automatic Generation of Javascript on Server-Side

Fig. 5
Registering Different Methods per Session

```
<%@ page import="com.alphablox.blox.PresentBlox,
       com.alphablox.blox.ServerBloxException"%>
<%@ taglib uri='bloxtld' prefix='blox'%>
<%@ taglib uri='bloxuitld' prefix='bloxui'%>
<blox:data id="calldata" dataSourceName="qcc-msas" useAliases="true" visible="false"
    query="SELECT {([Time].[Calendar].[All Time Periods].[2000],[Qtr 4 00], [Scenario].[All Scenario].[Actual]), ([Time].[Calendar].[All Time
Periods].[2000],[Qtr 3 00], [Scenario].[All Scenario].[Actual]), ([Time].[Calendar].[All Scenario].[Budget]),
([Time].[Calendar].[All Time Periods].[2001],[Qtr 1 01], [Scenario].[All Scenario].[Budget]), ([Time].[Calendar].[All Time Periods].[2001],[Qtr 2 01],
[Scenario].[All Scenario].[Budget])} ON COLUMNS, {[Locations].[All Locations].Children} ON ROWS FROM QCC" />

<blox:present id="callpresent" width="600" height="500" menubarVisible="true" chartAvailable="false" visible="false">
  <blox:toolbar visible="true" />
  <blox:grid bandingEnabled="true" />
  <blox:data bloxRef="calldata" />
</blox:present>
<%-- Create and register a J2EE session bean --%>
<jsp:useBean class="MyBean" scope="session" id="myBean">
<%
    myBean.setBlox( callpresent );
%>
</jsp:useBean>
<html>
<head>
<%-- Register the bean as a client bean --%>
<blox:header>
    <blox:clientBean name="myBean" />
</blox:header>
<script>
// Use ClientBean to invoke method on the bean
function showDataLayout( show )
{
    // Call the server-side bean's method
    var result = myBean.showDataLayout( show );

// Display the return value from the server-side bean method
    alert( "Result type: " + typeof result + "\r\n\r\n" + result );
}
</script>
</head>
<body>
<input type="button" value="Hide Data Layout" onclick="showDataLayout( false );" >
<input type="button" value="Show Data Layout" onclick="showDataLayout( true );" >
</body>
</html>
```

Fig. 6(a)
Example JSP Page

```
                                                        MyBean.java
    import com.alphablox.blox.PresentBlox;
    import com.alphablox.blox.ServerBloxException;

public class MyBean {
        private PresentBlox blox;

public MyBean( )
        {
        } public void setBlox( final PresentBlox blox ) {
            this.blox = blox;
        } public String[] showDataLayout( boolean show ) {
            try {
                blox.setDataLayoutAvailable( show );
            } catch (ServerBloxException e) {
                e.printStackTrace();
            } return new String[] { "one", "two", "three" };
        }
}
```

Fig 7
Example of bean

```
                              bean_myBean.js
/* Automatically Generated JavaScript - do not modify */          ┌ 120
function ImyBean( )
{
        // Public methods                          ┐
        this.showDataLayout = _showDataLayout;     ├─ 802
        this.setBlox = _setBlox;                   ┘ function _showDataLayout( arg1 ) {                          ┐
                var soap = new SimpleSoapRequest( "callBean" );     │
                soap.addParameter( "bean", "myBean" );              ├─ 804
                soap.addParameter( "method", "showDataLayout" );    │
                soap.addParameter( "arg1", arg1, "boolean" );       │
                return bloxAPI.rpc( soap );                         ┘
        }
        function _setBlox( arg1 ) {                                 ┐
                var soap = new SimpleSoapRequest( "callBean" );     │
                soap.addParameter( "bean", "myBean" );              │
                soap.addParameter( "method", "setBlox" );           ├─ 806
                soap.addParameter( "arg1", arg1 );                  │
                return bloxAPI.rpc( soap );                         ┘
        }
}
var myBean = new ImyBean( );    808
document.myBean = myBean;
                          810
```

Fig 8

```
<html>
<head>
<!-- START ALPHABLOX HEADER -->

<META HTTP-EQUIV="Pragma" CONTENT="no-cache">
<LINK REL="stylesheet" HREF="/AlphabloxServer/theme/coleman/coleman.css" TYPE="text/css">
<LINK REL="stylesheet" HREF="/AlphabloxServer/theme/coleman/coleman_dhtml.css" TYPE="text/css">
<LINK REL="stylesheet" HREF="/AlphabloxServer/theme/coleman/dhtml_view.css" TYPE="text/css">

<SCRIPT>
var _appContext = "dca";
var _appName = "dca";
var _renderType = "dhtml";
var _pollInterval = 120000;
var _homeURL = "/dca/abx/peer/myBean.jsp?AAS_QZ=1072744706967";
var _themeName = "coleman";
var _imageURL = "/AlphabloxServer/theme/coleman/i/";
var _prefixURL = "";
var _ibarArray = [ ];
</SCRIPT>

<SCRIPT LANGUAGE="javascript" src="/AlphabloxServer/theme/aas.js"></SCRIPT>
<SCRIPT LANGUAGE="javascript" src="/AlphabloxServer/jslib/compatibility.js"></SCRIPT>
<SCRIPT LANGUAGE="javascript" src="/AlphabloxServer/jslib/stringUtilities.js"></SCRIPT>
<SCRIPT LANGUAGE="javascript" src="/AlphabloxServer/jslib/dhtml/browserCheck.js"></SCRIPT>
<SCRIPT LANGUAGE="javascript" src="/AlphabloxServer/jslib/dhtml/core.js"></SCRIPT>
<SCRIPT LANGUAGE="javascript" src="/AlphabloxServer/jslib/dhtml/BloxHttp.js"></SCRIPT>  902
<SCRIPT LANGUAGE="javascript" src="/AlphabloxServer/jslib/dhtml/Soap.js"></SCRIPT>  904
<SCRIPT LANGUAGE="javascript" src="/AlphabloxServer/jslib/dhtml/BloxAPI.js"></SCRIPT>
<SCRIPT LANGUAGE="javascript" src="/AlphabloxServer/jslib/dhtml/Events.js"></SCRIPT>
<SCRIPT LANGUAGE="javascript" src="/AlphabloxServer/jslib/dhtml/Blox.js"></SCRIPT>
<SCRIPT LANGUAGE="javascript" src="/AlphabloxServer/jslib/dhtml/Dialog.js"></SCRIPT>
<SCRIPT LANGUAGE="javascript" src="/AlphabloxServer/jslib/dhtml/clientToolbarAPI.js"></SCRIPT>
<SCRIPT LANGUAGE="javascript" src="/AlphabloxServer/jslib/dhtml/color.js"></SCRIPT>
<SCRIPT LANGUAGE="javascript" src="/AlphabloxServer/jslib/dhtml/grid.js"></SCRIPT>
<SCRIPT LANGUAGE="javascript" src="/AlphabloxServer/jslib/dhtml/cell.js"></SCRIPT>
<SCRIPT LANGUAGE="javascript" src="/AlphabloxServer/jslib/dhtml/utility.js"></SCRIPT>
<SCRIPT LANGUAGE="javascript" src="/AlphabloxServer/temp/script/dca/bean_myBean.js"></SCRIPT>  906

<!-- END ALPHABLOX HEADER -->
```

Fig. 9a
HTML Sent to Server

```
<script>

// Use ClientBean to invoke method on the bean
function showDataLayout( show )
{
    // Call the server-side bean's method
    var result = myBean.showDataLayout( show );

// Display the return value from the server-side bean method
    alert( "Result type: " + typeof result + "\r\n\r\n" + result );
}

</script>
</head>
<body>
<input type="button" value="Hide Data Layout" onclick="showDataLayout( false );" >
<input type="button" value="Show Data Layout" onclick="showDataLayout( true );" >
</body>
</html>
```

Fig. 9b
HTML Sent to Server
(cont.)

US 7,500,223 B2

AUTOMATICALLY CREATING JAVASCRIPT OBJECTS TO INVOKE METHODS ON SERVER-SIDE JAVA BEANS

BACKGROUND

1. Technical Field

The present invention generally relates to the JAVASCRIPT™ programming language (hereinafter referred to as JavaScript) operating in a J2EE server environment, and more specifically to a method and system for automatically creating and delivering JAVASCRIPT™ objects to invoke methods on server-side JAVA™ programming language beans (hereinafter referred to as Java beans) without the need for additional installations on the client browser machine.

2. Background of the Invention

A common problem is distributed applications, and specifically in Web applications, is how to invoke server-side code from a remote client (Web browser). Conventional solutions such as CORBA (Common Object Request Broker Architecture), RMI (Remote Method Invocation), and SOAP (Simple Object Access Protocol) all address this problem. Each of these has disadvantages however, a primary disadvantage being their complexity. Other disadvantages include the requirement for an IDL (interface definition language), and additional components that need to be installed into the browser environment. For example, a client-side program has to know which parameters are required to make a call to a standard server-side servlet (such as a JSP (Java Server Page)). These parameters must be explicitly coded as a URL parameter, so that every time a server-side servlet and/or bean is changed, the client-side call must be re-programmed. In other words, the basic code must be written both on the server and the client to wire client-side calls to server-side beans. Moreover, not all remote clients should be allowed to invoke all server-side methods.

What is needed is a simple way to invoke a method on server-side Java beans that also maintains security features relating to who can invoke the methods without additional installations and other complexity on the client.

SUMMARY OF THE INVENTION

The described embodiments of the present invention simplify the use of server-side methods. The described embodiments require no client installation when using Internet Explorer 5.5 and above. Other embodiments, of course, support other browsers. No developer or user setup is required on the client and no IDL needs to be written or maintained.

A preferred embodiment of the invention examines a server-side Java bean and automatically generates in realtime a JavaScript representation to provide programmatic access to the server bean by a client. The JavaScript representations of the methods are sent to the Web browser. The browser then creates JavaScript objects that can be called directly from other JavaScript code on the client side.

A developer of JSP (Java Server Pages) identifies which session-scoped server beans he wants to be available on the client. The developer can also identify exactly which methods from those beans should be made available. Once the beans have been identified, the server (or other appropriate data processing system) generates JavaScript source code for each bean, which is then added to the page delivered to the client's browser. The generated source creates an object on the client with the same name as the server-side bean and provides proxy methods for all of the previously identified server-side bean methods. The net result is that the JavaScript code can simply invoke server-side bean methods.

BRIEF DESCRIPTION OF THE DRAWINGS

FIG. 6b provides an example of a browser display generated by the JSP page of FIG. 6a.

DETAILED DESCRIPTION OF PREFERRED EMBODIMENTS

A. Background:

JavaScript is an interpreted script language from Netscape Communications Corporation, based in Mountain View, Calif. JavaScript code can be imbedded in HTML pages and interpreted by the Web browser or client.

Java Server Page (JSP) is a server-side technology for generating servlets, small programs that produce a Web page and run on the server.

A browser enabled for DHTML (Dynamic HTML) treats each page element (division or section, heading, paragraph, image, list, and so forth) as an "object." For example, each heading on a page can be named, given attributes of text style and color, and addressed by name in a small program or "script" included on the page. This heading or any other element on the page can be changed as the result of a specified event such a mouse passing over or being clicked or a time elapsing.

Figure 1:
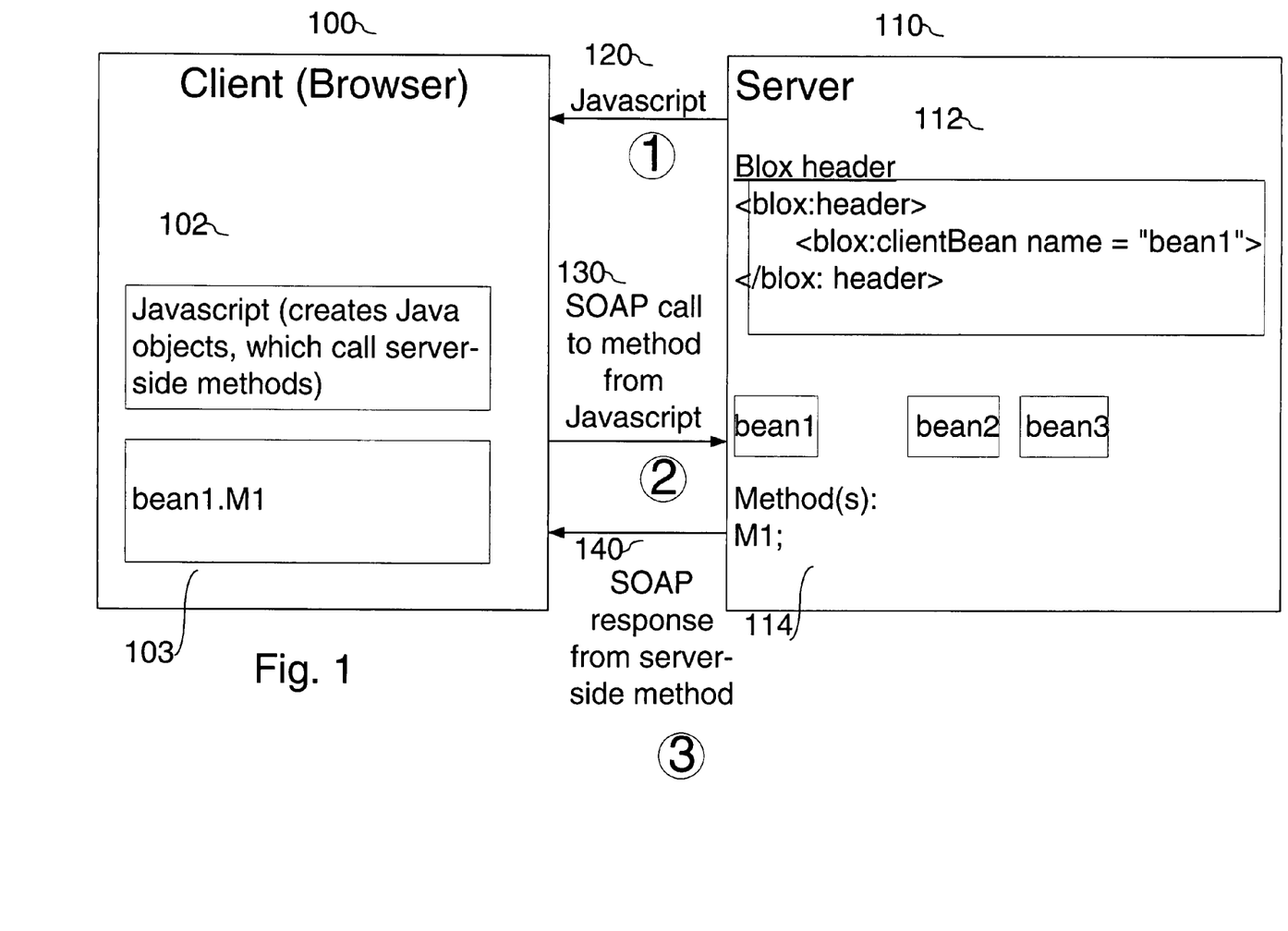
FIG. 1 is a block diagram showing a client and a server data processing system.

B. Embodiments:

FIG. 1 is a block diagram showing a client and a server data processing system. The system includes a client 100 (such as a Web browser) and a server 110 (which can be any standards-based Java application server). Client 100 and server 110 are preferably connected via a network, such as the Internet or an intranet, although they can be connected using any appropriate connection that allows the transfer of data. In the example, server 110 includes several server-side beans. Particularly, server 110 includes several Java beans (beans1, beans2, beans3) including corresponding methods. For example, bean1 114 includes a method M1. (While bean2 and bean 3 may also have methods, these are not shown for simplicity of example). A developer written JSP, available from server 110, includes a clientBean JSP tag describing which bean(s) and methods to be made available on the client. As will be discussed below, server 110 automatically creates a JavaScript file corresponding to bean1 and its method M1 and sends the JavaScript file along with the HTML page to the client 100 so that the client can easily invoke server-side methods. In the described embodiment, the JavaScript file is a separate file, and a reference to the generated JavaScript file is included in the HTML page. This is all a result of including clientBean JSP tag 112 in the JSP page.

FIG. 1 shows transfer 120 of the JavaScript file to client 100. This JavaScript will be executed on client 100 to create a client-side object 103 corresponding to server-side bean1 114. This client-side Java object 103 can then be invoked by client-side software, causing a call 130 from client 100 to server-side method M1. The server-side methods may return results 140.

The described embodiments of the present invention simplify the use of server-side methods. A preferred embodiment of the invention examines a server-side Java bean that is registered with the server (such as bean1) and automatically generates a JavaScript representation of the methods in the bean. The JavaScript representations of the methods are sent to the Web browser 100. The browser then creates JavaScript objects 103 that can be called directly from other code on the client side.

On the server, a developer of JSP (Java Server Pages) identifies which session-scoped server beans (such as bean1) he wants to be available on the client. The developer can also identify exactly whether all or some methods from those beans should be made available. Once the beans have been identified, the server generates JavaScript source code for each bean, which is then added to the page delivered to the client's browser. The generated source creates an object on the client with the same name as the server-side bean and provides proxy methods for all of the previously identified server-side bean methods. The net result is that the JavaScript code can simply invoke server-side bean methods.

Figure 2:
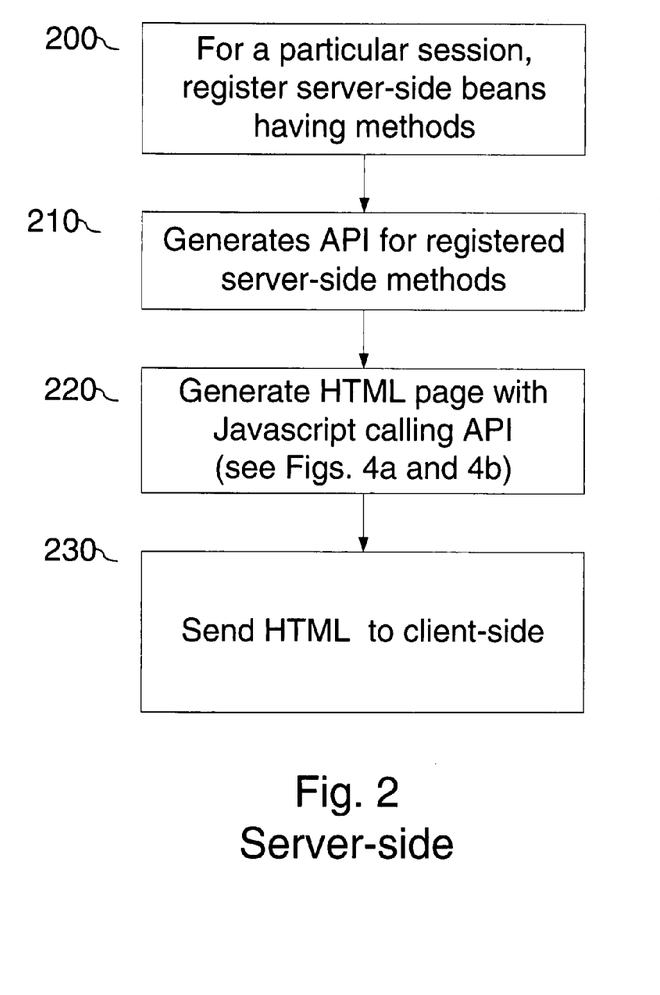
FIG. 2 is a flowchart showing a server-side process.
Figure 5:
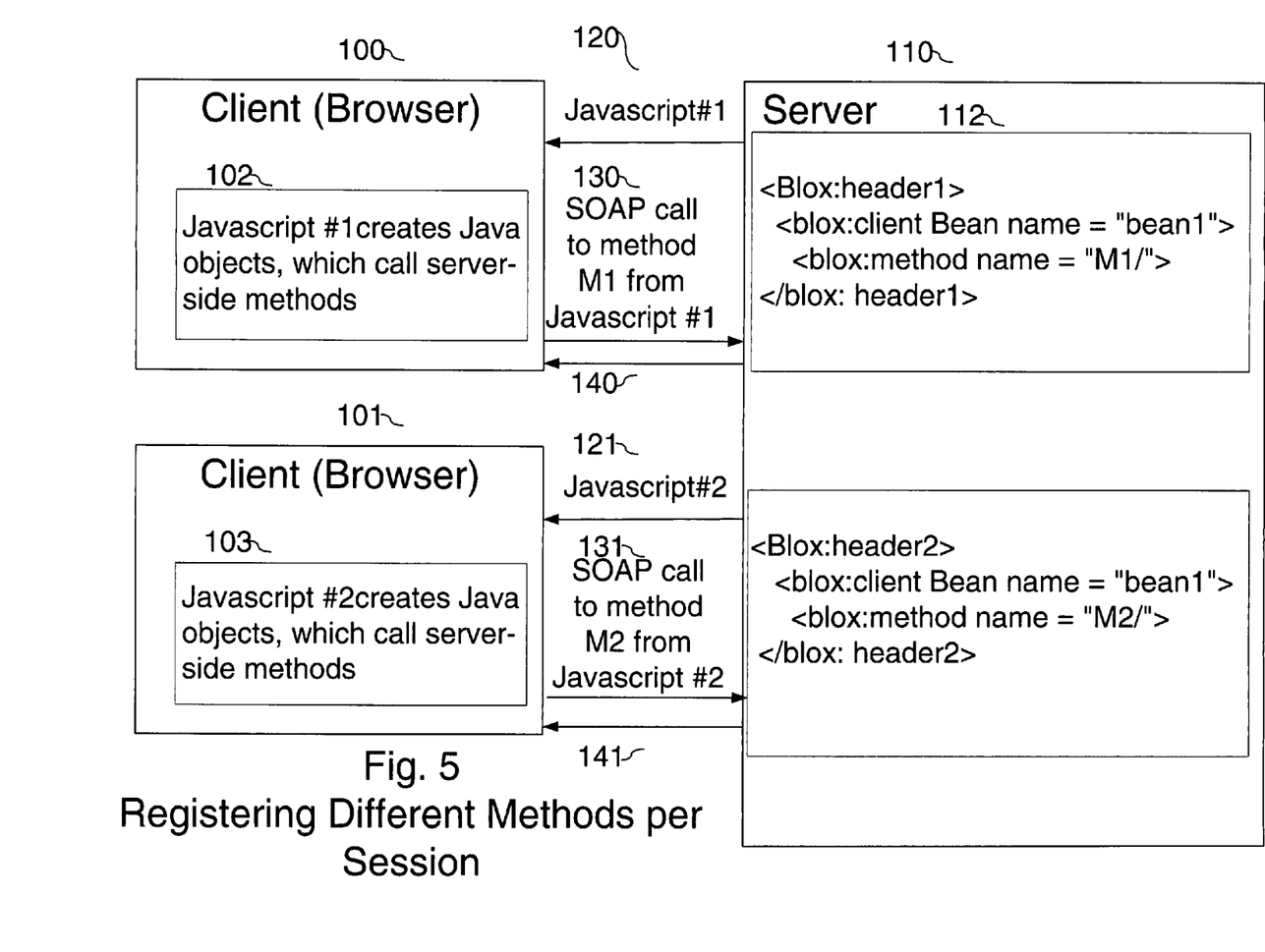
FIG. 5 is a block diagram showing two clients and a server data processing system where the two clients are allowed to access different server-side methods.

FIG. 2 is a flowchart showing a server-side process. In the described embodiment, a JavaScript file is created for each unique combination of bean and bean methods to be delivered to each client. Thus, each of a plurality of clients will receive an individualized JavaScript that controls which server-side method that client will be able to access on each exposed bean. More details are shown in FIG. 5.

Initially, the Java beans are instantiated on the server side using conventional techniques, such as those techniques familiar to users of Java 2, Enterprise Edition (J2EE). For each session, beans are registered 200. An API (Application Program Interface) for the server-side methods results from the instantiation 210. It will be understood that these beans can be obtained from various sources, such as customers, or from the owner of the server 110.

For each session, beans are registered 200. In the described embodiment, this entails:

1) creating a JSP tag header 112 by a human programmer as shown in FIG. 1, 2) adding the term "clientBean" to the header specifying the name of the bean, 3) specifying the specific methods to be available. This third step is optional.

Registration of beans creates corresponding data structures storing the results of the registration.

As an example, a blox header that does not specify which methods of a bean can be accessed might look like this:

```
<blox:header>
    <blox:client Bean name = "bean1">
</blox: header>
```

In this example, all methods of bean1 are exposed to the client.

As another example, a blox header that specifies which methods of a bean can be accessed might look like this:

```
<blox:header>
    <blox: clientBean name = "bean1">
        <blox: method name = "M1">
        <blox: method name = "M2" protect = "T"/>
</blox: header>
```

In this example, method M1 of bean1 is exposed to being called from the client. Furthermore, in this example, a "protect" parameter for a method M2 is explicitly set to TRUE. Thus, in this example, the method M2 of bean1 cannot be accessed.

It should be noted that the registration process is accomplished using JSP "tags" that are familiar to programmers in the JSP and JavaScript environments. Thus, being able to register a bean and its methods using <blox:header>, <blox:clientBean>, and <blox:method> tags feels very familiar and easy to understand to the JSP programmer. It should be understood that other syntaxes could be used to indicate that beans and their methods should be registered as available to the client.

Figure 4A:
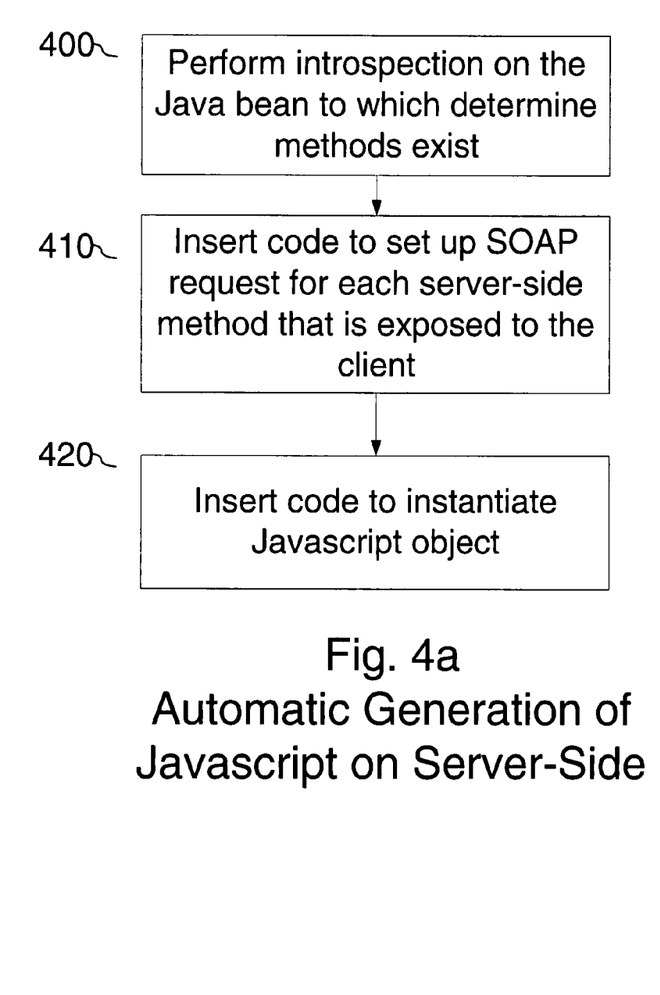
FIG. 4a is a flowchart showing automatic generation of JavaScript by a server-side.

In element 220 of FIG. 2, as a result of the registration, server 110 automatically generates a JavaScript file corresponding to the registered methods (i.e., the methods exposed/allowed to the client). The name of the JavaScript file is uniquely identified based on the bean name and the allowed methods. The JavaScript file preferably has a cyclic redundancy check (CRC) code computed from the method list if and only if methods were specified at registration to uniquely identify the generated JavaScript file. If no method were explicitly specified, then there is no CRC added to the JavaScript name. In a preferred embodiment, if the JavaScript file was previously created, then server 110 uses the previously created file if it was cached on the server (or other appropriate place). Details of element 220 creating a JavaScript file are shown in FIG. 4.

In element 230, server 110 adds the created JavaScript file to a Web page (as, for example, a JavaScript include) and sends the web page to a client upon request using a conventional mechanism. In at least one embodiment, the JavaScript is added using a <script> tag. In another embodiment, the JavaScript is added using an include of the JavaScript file.

Figure 3:
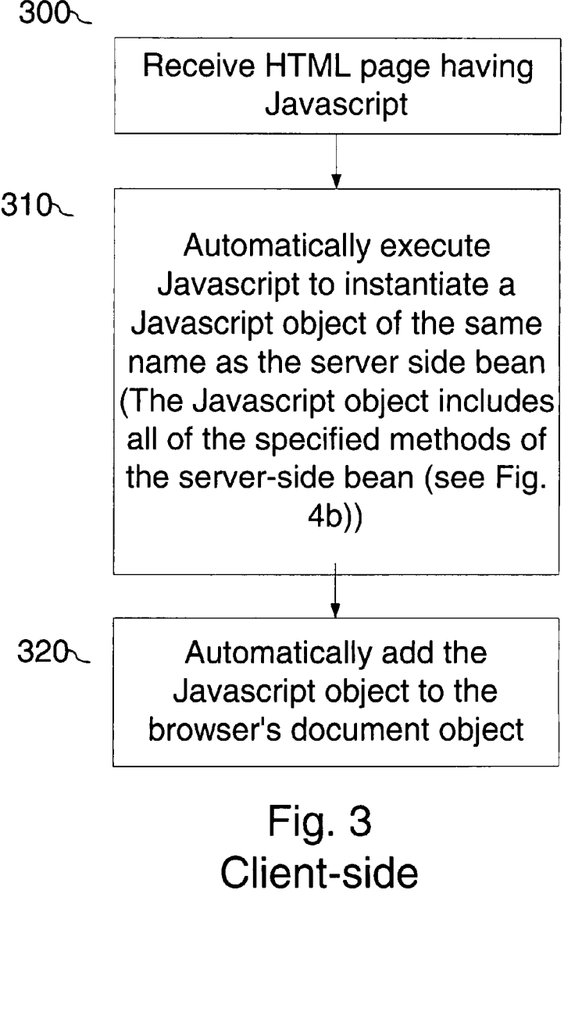
FIG. 3 is a flowchart showing a client-side process.

FIG. 3 is a flowchart showing a client-side process. In element 300, the browser loads a Web page containing the automatically generated JavaScript. In element 310, the JavaScript is automatically executed using conventional mechanisms to instantiate a JavaScript object of the same name as the server side bean. The JavaScript object includes all of the specified methods of the server-side bean (which may be all). In element 320, the JavaScript object is added to the browser's document object using conventional mechanisms. Elements 310-320 occur due to the standard ways that a browser handles a JavaScript file.

The result of the process of FIG. 3 is that user-written JavaScript code on the client side can invoke methods on the server-side bean through the instantiated JavaScript object. It is important to note that the present invention requires no changes, installations, or modifications to the client side or browser. Thus, there is zero installation when using browsers equipped to work with the invention (such as, for example, Internet Explorer 5.5 and above). No developer or user setup is required on the client.

When the bean method is called from JavaScript on the client side, Java objects returned from the bean methods called on the server are converted to JavaScript objects on the client. This works in both directions. JavaScript objects passed to the method are converted to Java objects when the method is called. In addition, Java exception(s) are also returned from the server to the client.

Figure 4B:
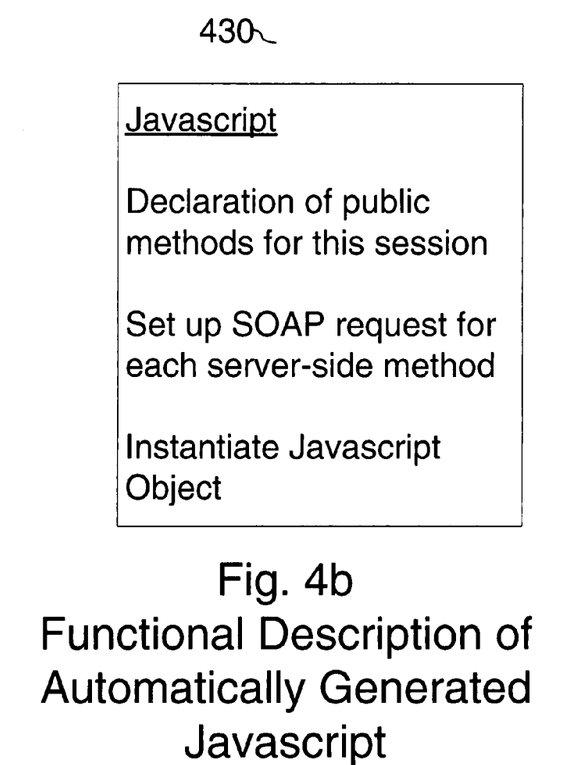
FIG. 4b is a functional description of an automatically generated JavaScript file.
Figure 8:
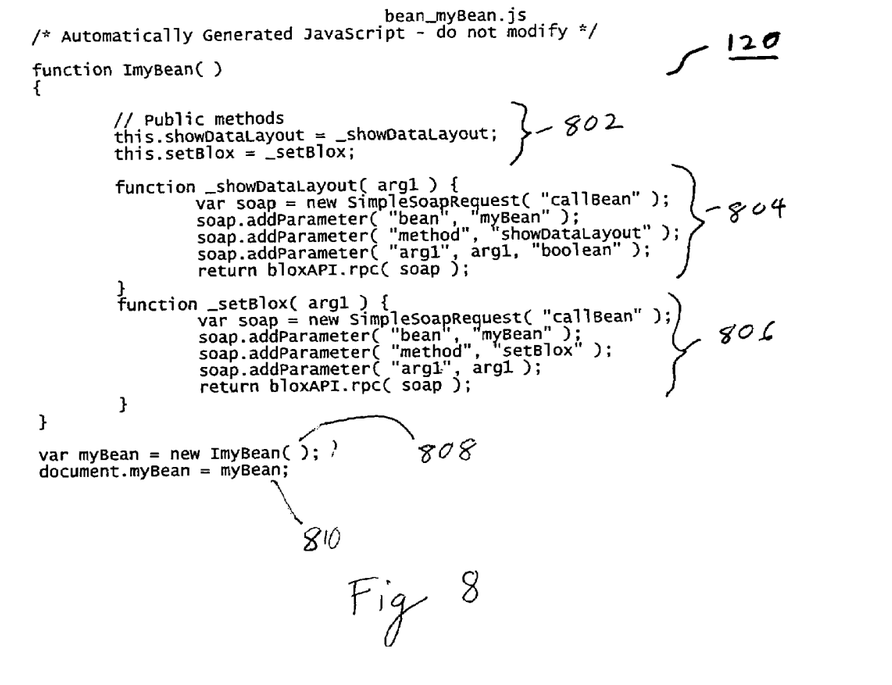
FIG. 8 provides an example of an automatically created JavaScript.

FIG. 4a is a flowchart showing automatic server-side generation of JavaScript. FIG. 4b shows the functions that are included within the JavaScript 102. Element 400 performs introspection on the Java bean to which methods exist (and have been registered as available to the client). Element 410 inserts JavaScript code to set up a SOAP request for each server-side bean method. Element 420 inserts JavaScript code to instantiate a client-side JavaScript object into the HTML page generated by the JSP. An example of a JavaScript is shown in FIG. 8, discussed below.

FIG. 4b shows the functions that are included within the JavaScript 102. As shown in the example of FIG. 8, these include a declaration of public methods for this session, Soap requests for each server-side method, and instantiation of a client-side JavaScript Object corresponding to the server-side object. FIG. 5 is a block diagram showing two clients and a server data processing system where the two clients are allowed to access different server-side methods of a bean (i.e., where different methods of the bean are registered for different client sessions). In the example, a server-side bean bean1 has two methods (M1 and M2). In this example, two JavaScript files are automatically created to allow two different clients to access different subsets of the methods from the same bean class. Specifically, client 100 can access method M1 and client 101 can access method M2. In the described embodiment, the name of Javascript#1 includes a CRC string based on the name M1 and the name of JavaScript #2 includes a CRC string based on the name M2. The use of a CRC serves to differentiate the JavaScript names and aids in the security of the system.

Figure 6A:
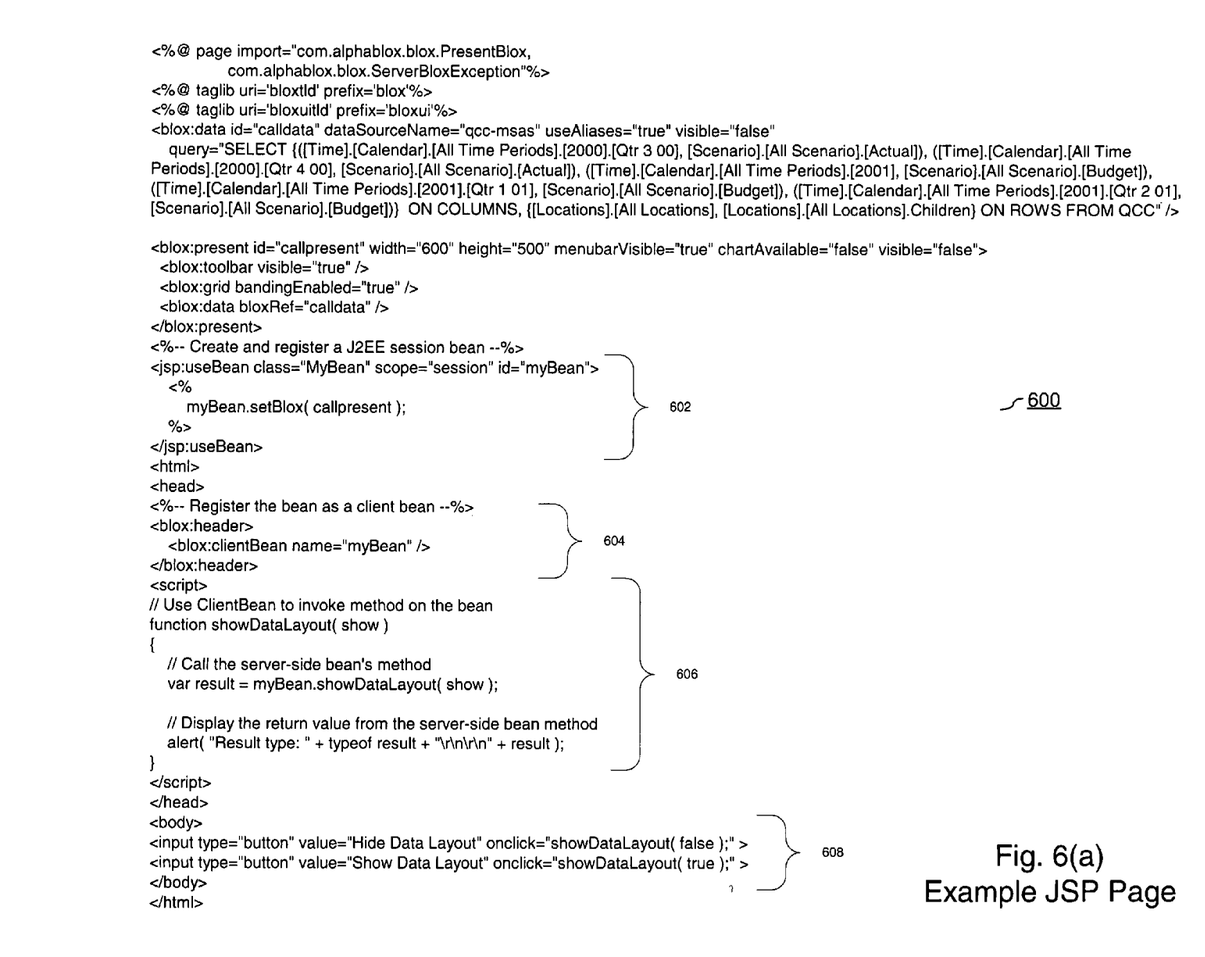
FIG. 6a provides an example of a full JSP page.

FIG. 6a provides an example of a full server-side JSP page 600 that demonstrates how to create and register a server-side bean This is one of many implementations of ways in which a bean can be registered with a J2EE server. Section 602 demonstrates an example of creating and registering a J2EE session bean. Section 604 demonstrates an example of registering the bean as a client bean so that it can be called from the client 100. Section 606 invokes the method of the bean by calling the server-side bean's method and displaying the return value from the server-side bean method.

Figure 6B:
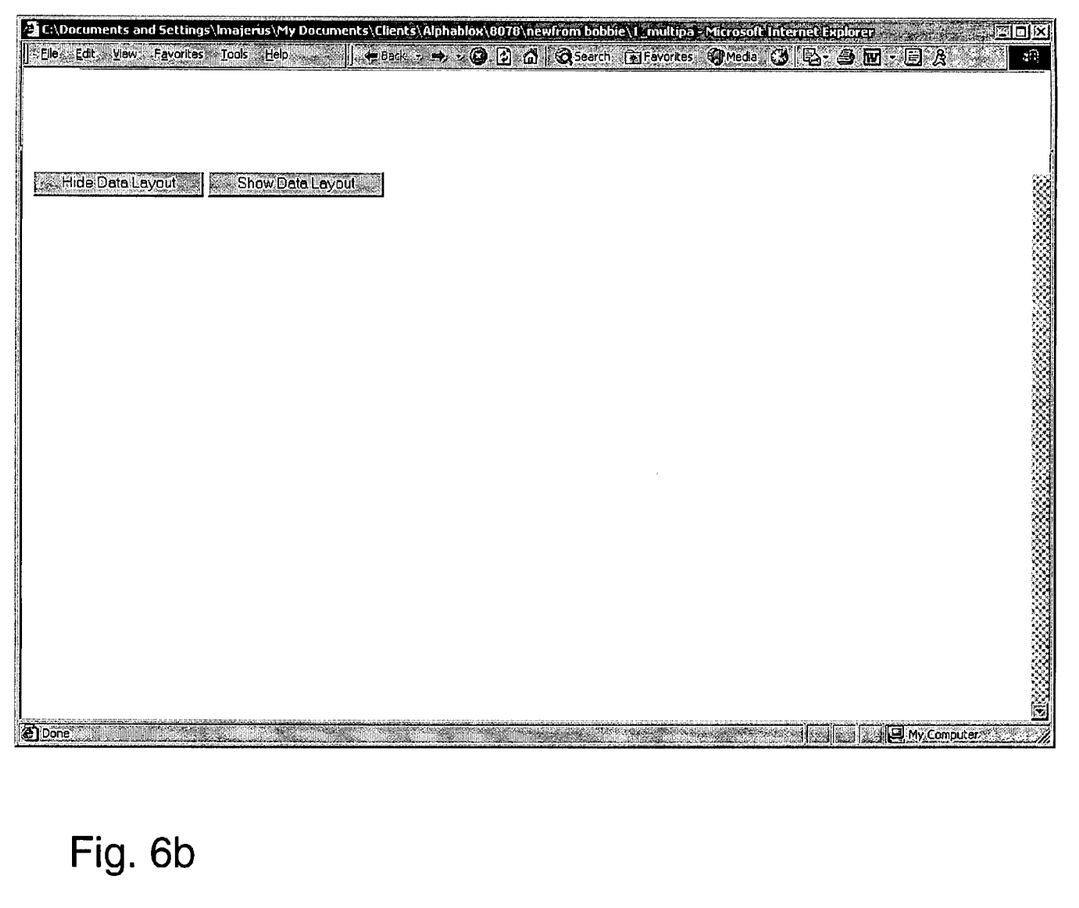

FIG. 6b provides an example of a browser display generated by the JSP page of FIG. 6a. The buttons visible are those defined in the JSP page and cause the browser to invoke JavaScript which in turn calls the server-side bean methods.

Figure 7:
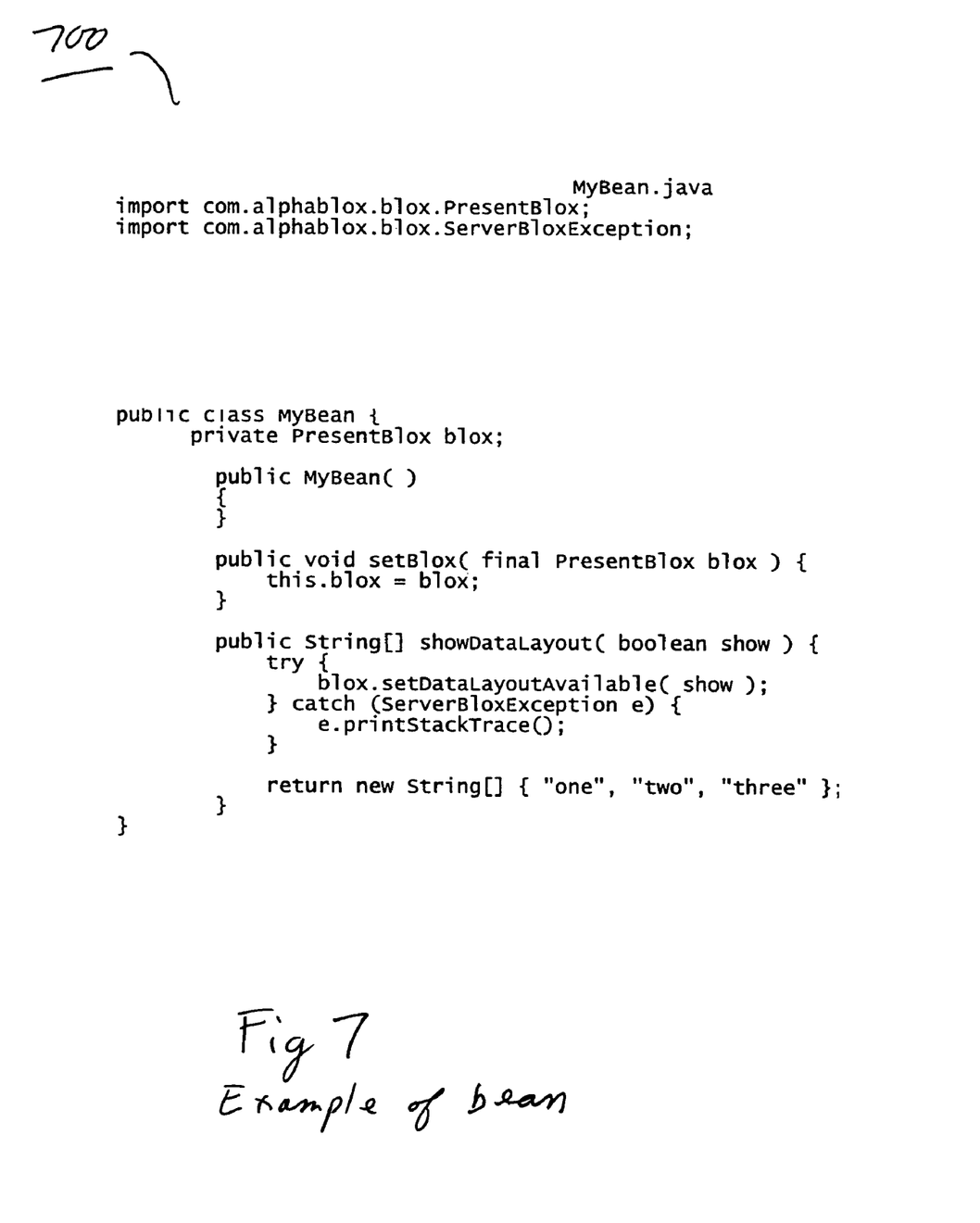
FIG. 7 provides an example of a server-side bean.

FIG. 7 provides an example of source for a server-side bean named MyBean having two methods setBlox and showDataLayout. Note that this bean is the bean registered in element 604 of FIG. 6.

FIG. 8 provides an example of an automatically created JavaScript file 102 for the bean MyBean of FIG. 7. Corresponding to the functionality shown in FIG. 4b, an element 802 declares methods of a server-side bean as public. In the described implementation, elements 804 and 806 set up SOAP requests for each server-side method for this session. The SOAP standard is well-known and is described in "SOAP Version 1.2 Part 1: Messaging Framework" Dec. 19, 2002, which is available from W3C at http://www.w3.org/TR/2002/CR-soap12-part1-20021219/, and which is herein incorporated by reference. It will be understood that any appropriate protocol, including both public and proprietary protocols, can be used in place of SOAP to pass parameters and results without departing from the spirit of the present invention.

Element 808 instantiates a client object and will be executed on the client. Element 810 adds the object to the browser's document object and will be executed on the client.

Figure 9A:
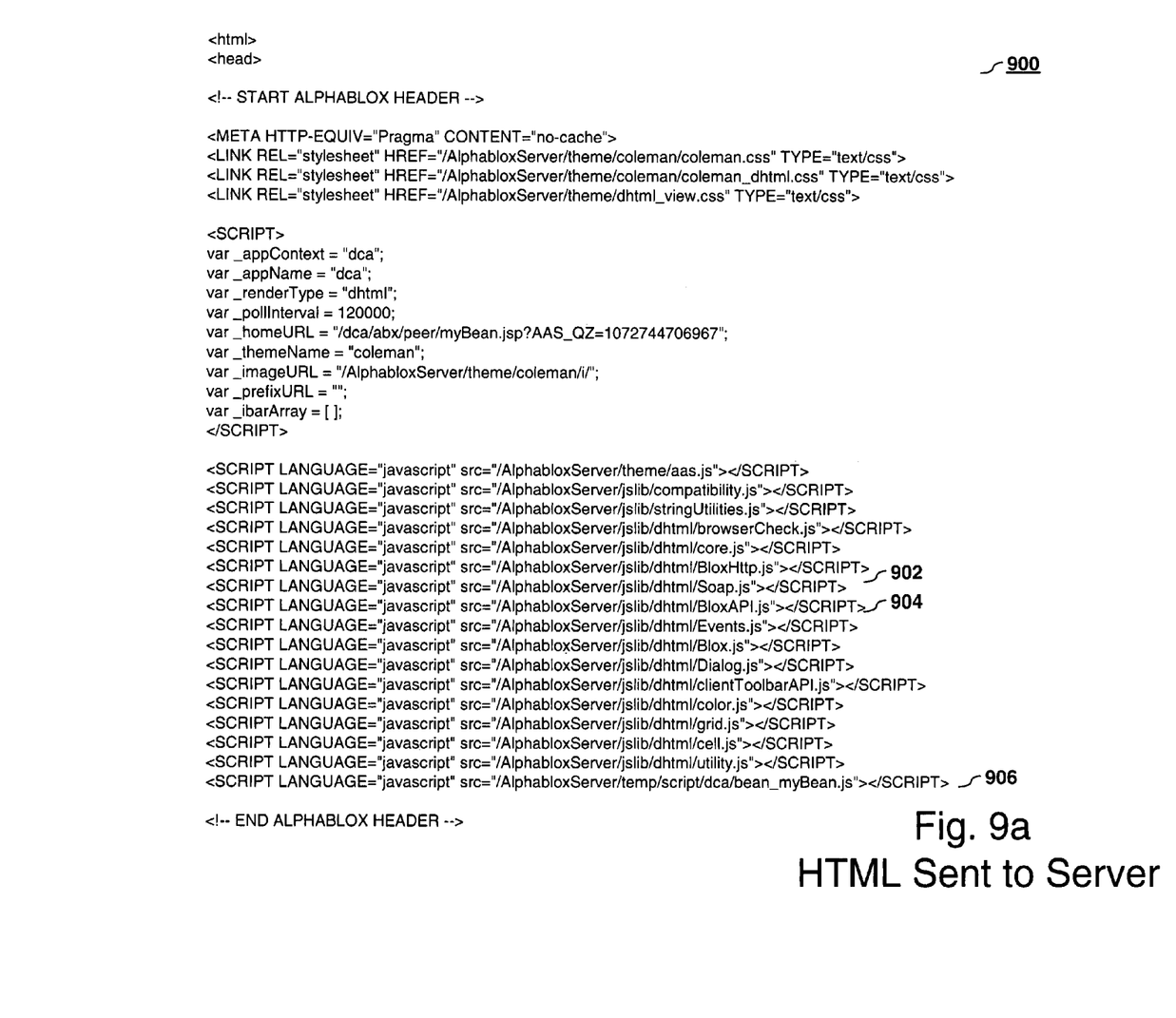
FIGS. 9a and 9b show an example of an HTML page sent to the client side, the HTML (Hyper Text Markup Language) page including the automatically created JavaScript.
Figure 9B:
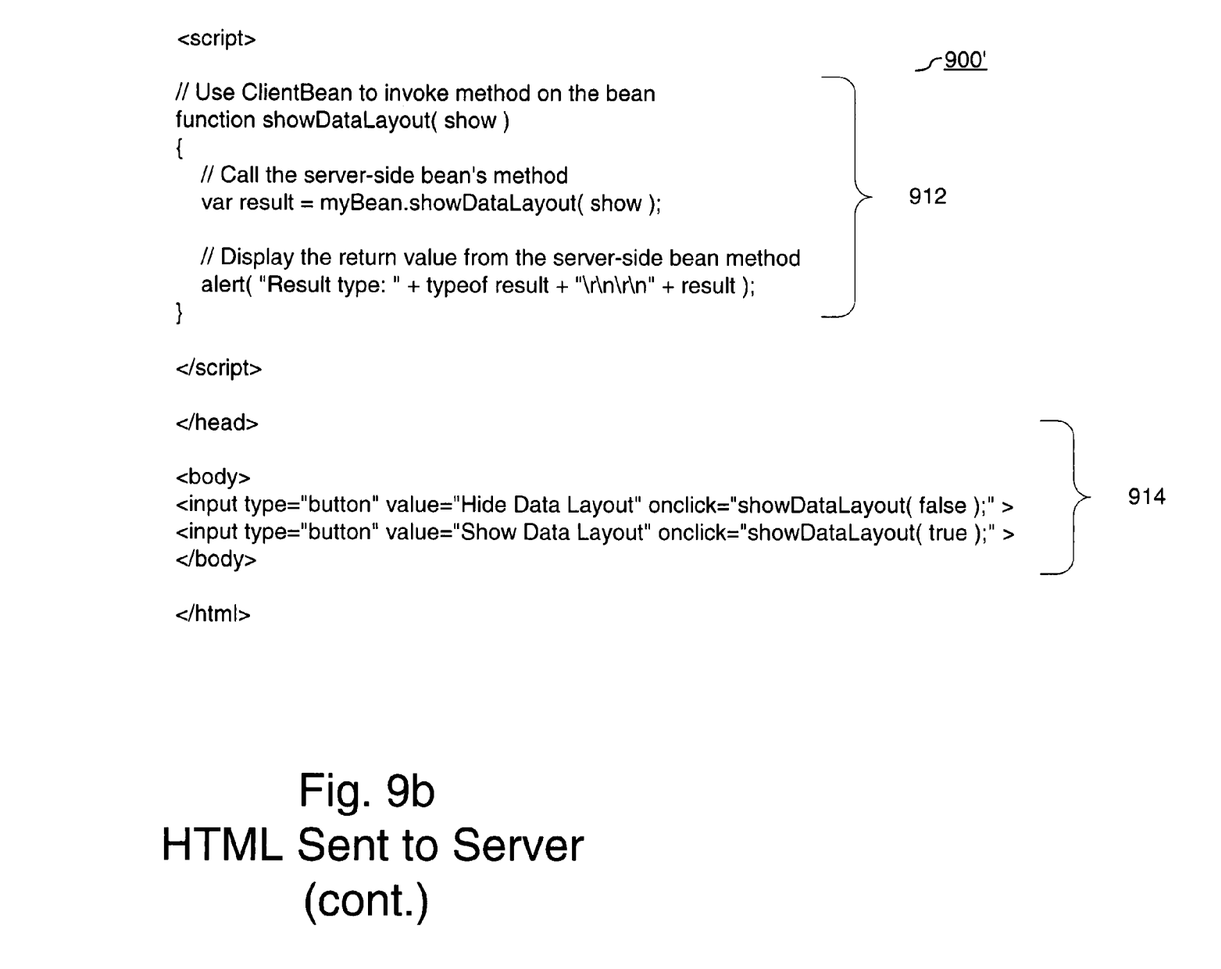

FIGS. 9a and 9b show an example of an HTML page sent to the client side, the HTML page including the automatically created JavaScript. In this embodiment, the HTML page is a rendered JSP page. The HTML page has a series of "included" files. A first included file 902 is a JavaScript file named Soap.js. An example of this file is shown in Table 1. This file implements the SOAP protocol to calls to and returns from the server-side methods. A second included file 904 is a JavaScript file named BloxAPI.js. An example of this file is shown in Table 2. A third included file 906 is a JavaScript file named bean_myBean.js. This is the automatically generated JavaScript file shown in FIG. 8. Tables 1 and 2 are a part of this specification and are herein incorporated by reference.

In FIG. 9b, which is a continuation of the HTML page, element 912 calls the server-side bean's method and displays the return value from the server-side bean method. Element 914 invokes the client method showDataLayout using an input of true and an input of false. In accordance with the invention, these parameters are passed to a server-side method called showDataLayout (see method in server-side bean of FIG. 7).

In the described embodiment, the automatically generated JavaScript file performs type conversion so that data sent to the server is in an expected format and data received from the server is converted to an expected format. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims and equivalents.

What is claimed is:

1. A process for setting up the execution of a set of specific server-side bean methods to be called by a client-side data processing system for during a specific session, comprising:

receiving a user-definition of a Java Server Page identifying a set of specific server-side bean methods that can be called by a client-side data processing system during a specific session;

creating a session-specific Application Program Interface on the server side for a the set of specific server-side bean methods;

automatically creating an JavaScript program that is unique to the client-side data processing system and the specific session, the JavaScript program containing calls to the set of specific server-side bean methods in accordance with the session-specific Application Program Interface, JavaScript program restricting the client-side data processing system to call only methods in the set of specific server-side bean methods during the specific session; and sending the created JavaScript program to the client-side data processing system; and executing the JavaScript program on the client side to call the methods in the set of specific server-side bean methods, including creating a Java object having the same name as a server-side bean.

2. The process of claim 1, wherein the interpreted script language program is executed by a non-modified standard browser program.

3. The process of claim 1, further including initially registering the set of specific server-side methods on the server side, wherein the registering includes identifying the set of specific registered server-side methods.

4. The process of claim 1, wherein the set of specific server-side methods includes all methods of a bean.

5. The process of claim 3, wherein registration is performed using Server Page tags.

6. The process of claim 1, wherein the session-specific Application Program Interface identifies parameters of the methods in the set of specific server-side methods.

7. The process of claim 1, wherein executing the interpreted script language program includes converting the parameters sent to the server side.

8. The process of claim 1, wherein executing the interpreted script language program includes converting results sent from the server side.

9. The process of claim 1, where executing the interpreted script language program further includes using Simple Object Access Protocol calls to invoke the methods in the set of specific server-side methods.

10. The process of claim 1, where executing the interpreted script language program further includes using Simple Object Access Protocol to return results from the methods in the set of specific server-side methods.

11. The process of claim 1, wherein the interpreted script language program includes instructions for:
   declaring public methods for a current session;
   setting up Simple Object Access Protocol requests for each server-side method in the set of specific server-side methods; and
   instantiating program objects on the client-side that correspond to server-side objects.

12. A process for executing a set of specific server-side methods by a client-side data processing system, performed by the client-side data processing system in a specific session and-comprising:
   receiving a JavaScript program, the JavaScript program being automatically created by the server-side, the JavaScript program being unique to the client-side data processing system and the specific session, the JavaScript program containing calls to the methods in the set of specific server-side bean methods in accordance with a session-specific Application Program Interface, the session-specific Application Program Interface being automatically created on the server-side for the set of the specific server side bean methods, the JavaScript program restricting the client-side data processing system to call only methods in the set of specific server-side bean methods during the specific session, the methods in the set of specific server-side bean methods being identified by a user-definition of a Java Server Page received by the server-side; and
   executing the JavaScript program on the client side to call only the methods in the set of specific server-side bean methods, including creating a Java object having the same name as a server-side bean.

13. The process of claim 12, further including passing parameters to the methods in the set of specific server-side methods when the interpreted script language program is executed on the client side.

14. The process of claim 12, further including receiving results from the methods in the set of specific server-side methods when the interpreted script language program is executed on the client-side.

* * * * *